340-870.11
SR
OR 3,005,978
SEARCH ROOM

Oct. 24, 1961 J. S. WAPNER 3,005,978

ELECTRO-PNEUMATIC DATA LOGGER

Filed Dec. 1, 1955 9 Sheets-Sheet 1

INVENTOR.
JOSEPH S. WAPNER.
BY Leonard L. Kalish
ATTORNEY.

INVENTOR.
JOSEPH S. WAPNER.
BY Leonard L. Kalish
ATTORNEY

ELECTRO-PNEUMATIC DATA LOGGER

Filed Dec. 1, 1955 9 Sheets-Sheet 3

INVENTOR.
JOSEPH S. WAPNER
BY Leonard L. Kalish
ATTORNEY.

INVENTOR.
JOSEPH S. WAPNER
BY Leonard L. Kalish
ATTORNEY.

INVENTOR.
JOSEPH S. WAPNER.
BY
ATTORNEY.

INVENTOR.
JOSEPH S. WAPNER.
BY Leonard L. Kalish
ATTORNEY.

ELECTRO-PNEUMATIC DATA LOGGER

Filed Dec. 1, 1955 9 Sheets-Sheet 7

INVENTOR.
JOSEPH S. WAPNER.
BY Leonard L. Kalish
ATTORNEY.

Oct. 24, 1961 J. S. WAPNER 3,005,978

ELECTRO-PNEUMATIC DATA LOGGER

Filed Dec. 1, 1955 9 Sheets-Sheet 8

INVENTOR.
JOSEPH S. WAPNER
BY Leonard L. Kalish
ATTORNEY.

INVENTOR.
JOSEPH S. WAPNER
BY Leonard L. Kalish
ATTORNEY.

1

3,005,978

ELECTRO-PNEUMATIC DATA LOGGER

Joseph S. Wapner, Hatboro, Pa., assignor to Fischer & Porter Company, Hatboro, Pa., a corporation of Pennsylvania Filed Dec. 1, 1955, Ser. No. 550,405
18 Claims. (Cl. 340—182)

The present invention relates to certain new and useful electro-pneumatic measurement-translating systems and means for use in measurement scanning and logging systems, namely, systems for taking periodic readings of the levels of process-measurements (or of any variable measurements), as, for instance, the readings of liquid-levels on a tank-farm or of the rate-of-flow readings or of the temperature readings in chemical or other processes.

The measurement scanning and logging systems for which the present invention is primarily intended, are those systems which include an electrical programmer operated by a synchronous (or clock type) motor and/or step-by-step relay or relays and which include one or more selector-switches which either periodically or continuously sweep a number of measurement-indicators and transmit the measurement-values thereof to a data recorder, with or without an intervening digital coder.

Such programmer and such measurement scanning and logging systems are known in the art. Hence, a detailed disclosure thereof, herein, is deemed unnecessary. The references, hereinbelow, to such programmer and to elements or components of such scanning and logging systems refer to those of the prior-art and to alternatives and substitutes therefor within the same general classes of devices and systems, except for such novel devices, systems and means as are herein disclosed.

In one aspect, the present invention is a novel electro-pneumatic system in which a pneumatically transmitted measurement is first translated into a time factor, whereby a length of time is made to represent such measurement (which time factor may be called the pulse-duration), and in which the so produced time factor is then translated into an electrical characteristic representing the same original measurement (as, for instance, a variation in voltage or potential), which electrical characteristic may then be read and recorded.

In the present invention, the measurement-value may be translated into the length of time it takes a cyclically varied pneumatic counterpressure or "sweep-pressure" to go from its predetermined low (or threshold) pressure to the pressure of the pneumatic measurement-signal reflecting the original measurement-value.

In other aspects, the present invention includes a pneumatically-operated electrical pressure-comparator switch (for each measurement-sending element to be read periodically). Such comparator-switch may, consist, for instance, of a limp diaphragm dividing a chamber into two parts or sides and carrying or operatively connected with) an electrical shorting bar or switch-element for closing and opening an electrical circuit between two electrical contacts operatively juxtaposed thereto. The chamber on one side of the diaphragm is connected to a sweep-pressure generator or to the compressed-air scanning-manifold thereof, while the chamber on the other side of the diaphragm is connected to a pneumatic line leading from a pneumatic pressure-transmitter (operated, piloted or) governed by a measurement-sensing element at the particular point-of-measurement or measurement-station, as, for instance, the transducer or transmitter disclosed in the co-pending application Serial No. 361,128, filed June 8, 1953, or in co-pending application Serial No. 382,155, filed September 8, 1953.

The present invention also includes other novel features

2 and means, as will more fully appear from the following specification and accompanying drawings.

The present invention also contemplates a scanning-manifold having air supplied to it from another pneumatic transducer or transmitter of the general type shown in the aforementioned Serial No. 361,128, which transmitter, instead of having its output-pressure governed by any measurement-sensing element, has the flapper (or movable valve-element) of its pilot-valve moved responsive to the rise and fall (or displacement) of a rotary (or other suitable cycling) cam turned (or otherwise cycled) by a synchronous motor at a suitable number of revolutions (or cycles) per minute, as, for instance, two revolutions per minute, so as to vary this scanning-manifold-pressure or "sweep-pressure" between two predetermined limits (as, for instance, between three and fifteen pounds per square inch), either in linear relation to time or in a square relation to time (or in any other suitable pre-determined relation to time), according to whether the measurement-pressure applied to the other side of the diaphragm is in linear relation to the measurement reflected thereby or whether it is in the square (or other) relation to such measurement.

Thus, the pressure-varying cam may be shaped so as to vary the scanning-manifold-pressure or sweep-pressure produced by the last-mentioned pneumatic transmitter (between the aforementioned or other suitable limits of pressure) in linear relation to time or in a square law relation to time or in any other relation to time as may be desired; the cam being shaped correspondingly.

When the scanning pressure or sweep-pressure in the manifold (applied to the switch-opening side of the diaphragm) exceeds the measurement-pressure (applied to the other side of the diaphragm), the switch is opened; while if the measurement-pressure is greater than the manifold-pressure then the switch is closed. A differential pressure of one-hundredth of a pound per square inch (0.01 p.s.i.) is sufficient to open or close the switch.

One embodiment of the present invention is what may be called the "read-out" embodiment; represented diagrammatically in FIGURE 1. In this embodiment the measurement-level is merely to be read periodically (as, for instance, once every hour) at each station or point-of-measurement, and such readings are recorded by any suitable means (as, for instance, a digit type data-printer) responsive to and operated by voltage variations. In this embodiment, the pressure-comparator-switch controls a synchronous motor, to start and stop it. Such motor drives the voltage-varying movable brush; slider or contact of a potentiometer, through a slip-clutch; with or without a gear-train interposed therebetween. The voltage output or potential-drop of such potentiometers are applied, in succession (through a programmer and stepped selector-switch operated thereby or forming a part thereof) to a digit type data-printer (or any other measurement-signaling or recording device), as, for instance, the automatic logger manufactured by the Fischer & Porter Company, of Hatboro, Pa. Such automatic logger includes a self-balancing potentiometer, as, for instance, a "Speedomax" manufactured by the Leeds & Northrup Company, of Philadelphia, Pa., which includes a Wheatstone bridge to which the first-mentioned potentiometer is connected to form one leg of such Wheatstone bridge. Such automatic logger also includes a digital coder or converter operated by the position assumed by the arm of the self-balancing potentiometer when it is balanced or when it reaches its null position. Such digital coder or converter may be, by way of example, the "Digi-Coder" now manufactured by the Fischer & Porter Company and which the subject-matter of co-pending application Serial No. 399,269, filed February 27, 1953, or the digital coder which is the subject-matter of co-pending application Serial No. 437,991, filed June 21, 1954. Such automatic logger also includes an electric signal operated typewriter, operated by the circuits or signals of such digital coder. Such typewriter may be, by way of example, the "Flexowriter" of the Commercial Controls Corporation of Rochester, N.Y.

A reset motor, energized during reset intervals (following each "read-out"), is connected to the first mentioned potentiometer to reset it to its threshhold position immediately after the completion of each read-out and before the first-mentioned synchronous motor is again set into operation for another periodic read-out, in the read-out embodiment of the present invention, or before another integrating-period is commenced, in the integrating embodiment of the present invention.

Another embodiment or extension of the present invention is what may be called the integrating embodiment thereof, represented diagrammatically in FIGURE 2. In this embodiment a memory-mechanism (including a memory-spring) is interposed between the synchronous motor and the potentiometer, preferably in a gear-train between such motor and potentiometer, and an electromagnetically operated brake is also provided in such gear-train, whereby the motion of the gear-train may be arrested during readout, while the synchronous motor continues to operate; whereby the angular displacement of such synchronous motor during read-out is accumulated in such spring (which is thereby wound up during such read-out), and whereby the so accumulated angular displacement is then applied to a potentiometer upon the completion of the read-out (when the brake is released).

In the accompanying drawings in which like reference characters indicate like parts:

Figure 9:
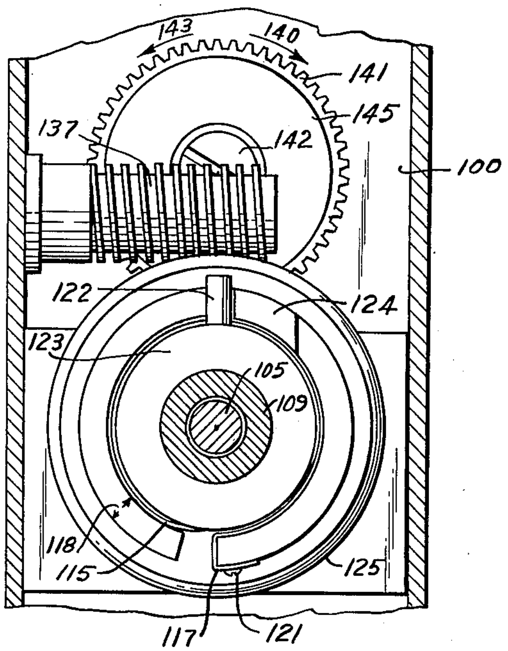
FIGURE 9 represents a section on line 9—9 of FIGURE 7.
Figure 10:
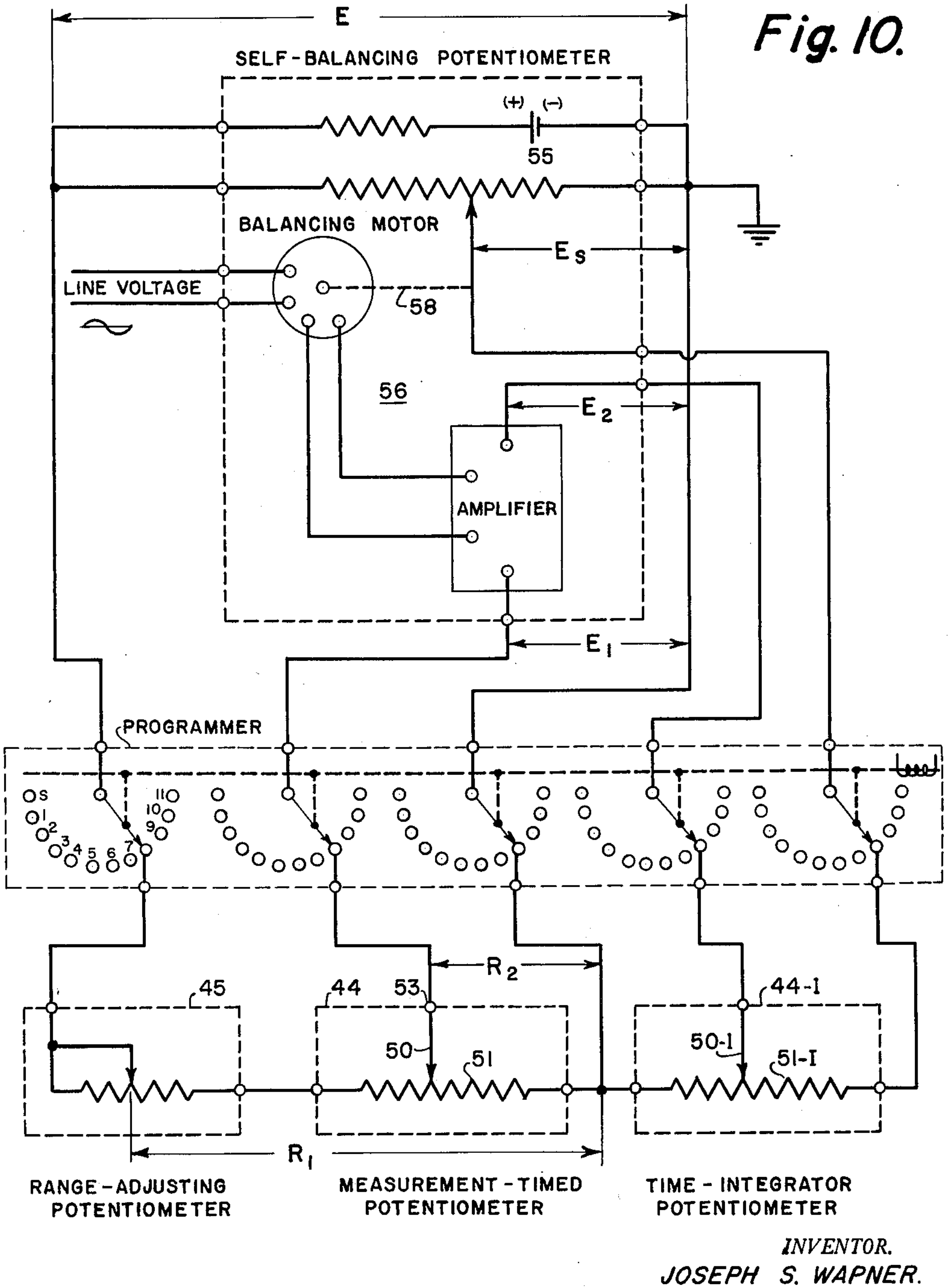

FIGURE 10 is a diagrammatic or schematic representation of the connection of one of the measurement-timed potentiometers units 44 (shown schematically in FIGURES 1 and 2, and shown, with the details of the driving mechanism, in FIGURES 3 to 9, inclusive), to the self-balancing potentiometer; the programmer and its selector-switch, which intervene the measurement-timed potentiometer and the self-balancing potentiometer, not being shown (also showing a time-integrator potentiometer unit 44–I included in the system).

Figure 11:
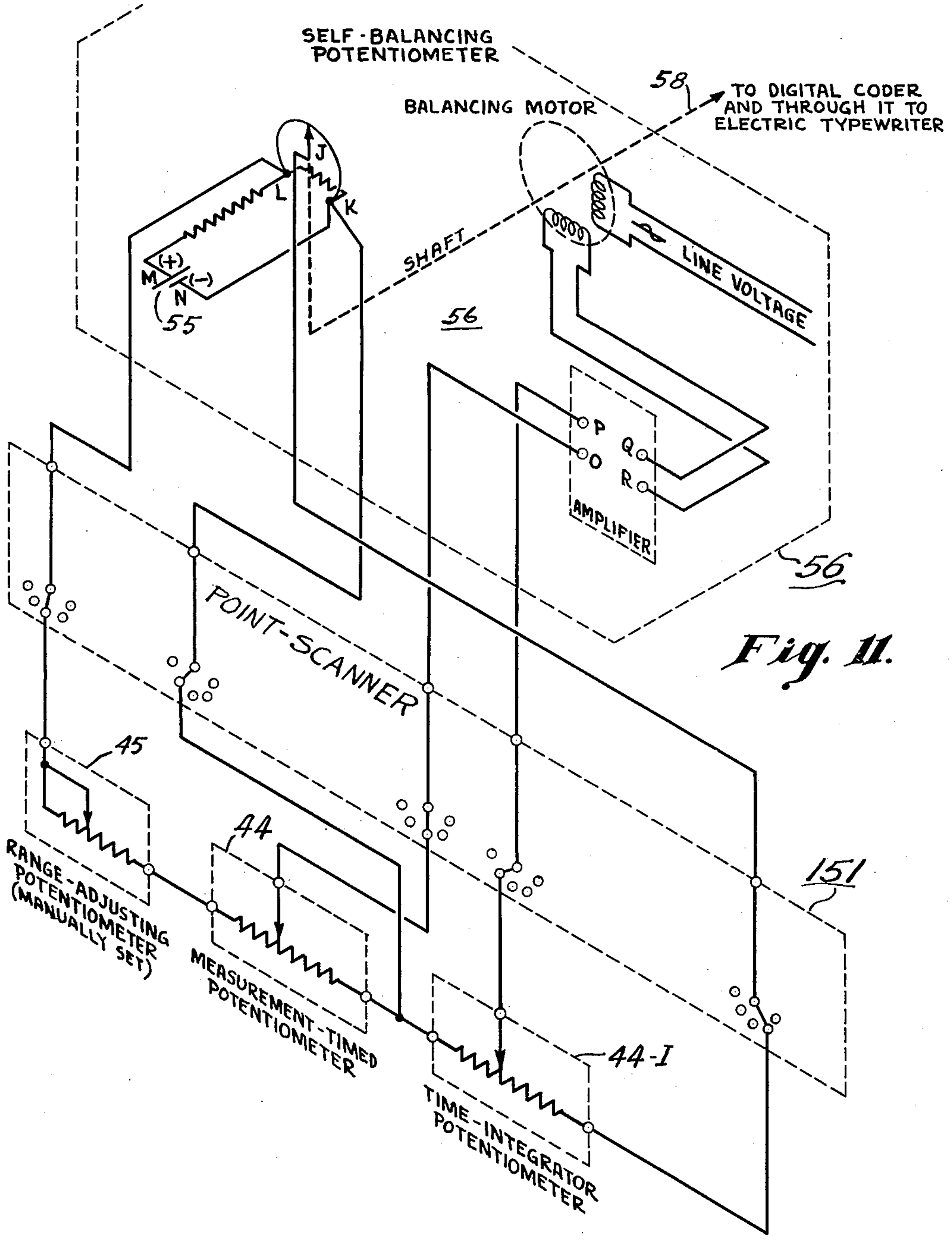

FIGURE 11 is another diagrammatic or schematic view, partly in perspective, of one of the measurement-timed potentiometers and the corresponding time-integrator potentiometers in the system.

Figure 12:
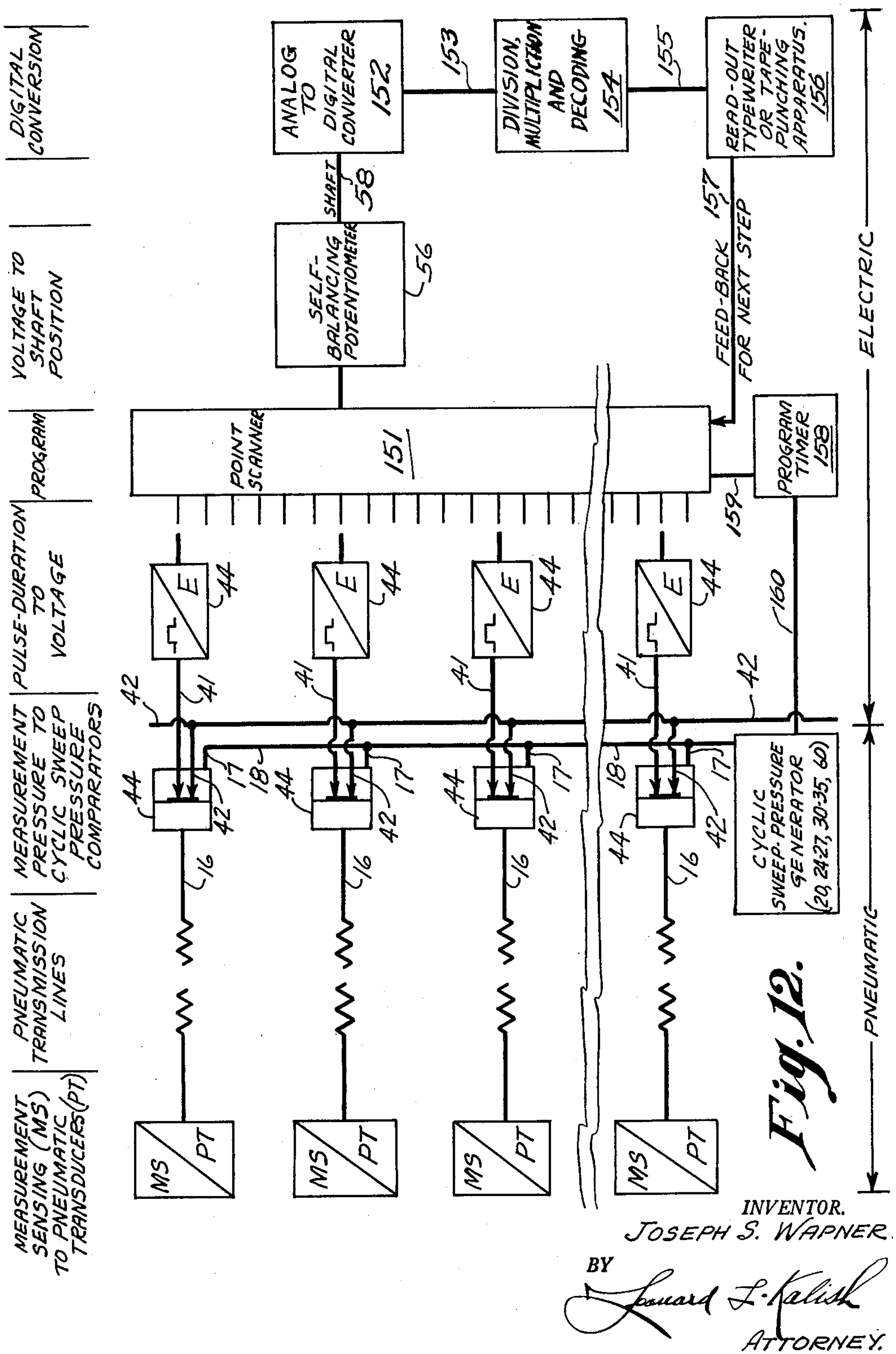

FIGURE 12 is a diagrammatic or schematic view of the entire system, from the pneumatic transducers to the read-out typewriter (on read-out tape, etc.)

The following is a brief description of the read-out embodiment of the present invention.

A pneumatically-operated pressure-comparator switch-unit 11 is provided for each point-of-measurement or for each pneumatic measurement-transmitter mentioned above.

Each pressure-comparator-switch 11 includes a pneumatic chamber 12 with a limp diaphragm (or other pressure-responsive movable element) 13 in said chamber and dividing it into two parts, namely, the measurement side or chamber 14 thereof and the counterpressure side or chamber 15 thereof.

The measurement side 14 of the comparator-switch 11 is connected, by the pneumatic line 16, to the output side of a pneumatic measurement transducer and transmitter (not shown), as, for instance, disclosed in co-pending application Serial No. 361,128, filed June 8, 1953, which delivers pneumatic pressure proportional to the measurement sensed by the measurement-sensing element, such as a rate-of-flow meter, a thermometer, etc. (which measurement-sensing element controls such pneumatic transducer and transmitter). This proportional relationship may be a linear relationship or a square law relationship (or some other mathematical relationship).

The counterpressure side 15 of the comparator-switch 11 is connected through the line 17 to a counterpressure or sweep-pressure manifold 18, to which a number (as, for instance, as many as a hundred) of such comparator-switches 11 may be similarly connected; the manifold 18 being of limited volume and being closed except for the connections 17 and 19.

The manifold 18 is connected through the line 19 to the output side of a pneumatic transmitter 20, as, for instance, that disclosed in co-pending application Serial No. 361,128, filed June 8, 1953, which receives a supply of compressed air (through its supply-line 21) at a fixed pressure, and which delivers an output-pressure through the line 19 which varies according to the position of the "flapper" or movable valve-element of its pilot-valve. The "flapper" (or valve-element) of the pilot-valve of the transmitter 20 is connected with and is moved by the lever-arm 24, which carries any suitable cam-follower 25. The cam-follower 25 rides on the cam 26.

The cam 26 is driven by a self-starting synchronous motor 27 through a one-revolution clutch mechanism 28 and through the shaft 29. The shaft rotates at 2 r.p.m. The rotor of the motor 27 may be directly connected to the shaft 29 or may be connected thereto through reduction gearing so as to permit the rotor to turn at a higher r.p.m. while the shaft 29 turns 2 r.p.m. The one-revolution clutch-mechanism 28 includes a cam 30 fixedly carried on the shaft 29 and a switch-lever 31 pivoted at 32 to a suitable part of a frame or housing or the like or to equivalent means. One end 33, of the lever 31 rides on the periphery of the cam 30, while the other end 34 thereof is mechanically connected with a micro-switch 35; the micro-switch being connected in the electric circuit of the motor 27.

The synchronous motor 27 is brought into operation by the read-out switch (not shown) of the programmer (FIGURES 10–12) of a measurement-scanning system; the read-out switch being rendered operative periodically (as, for instance, once every hour) by the programmer (or may be rendered operative manually at any intermediate time by a manually-operable read-out switch). When so energized, the motor 27 will rotate until stopped, at the end of one full revolution of the shaft 29, by the cam-follower end 33 of the switch-opening lever-arm 31 riding onto the high point of the cam 30, thereby opening the micro-switch 35 which is in the motor circuit.

When the read-out switch is first rendered operative, it establishes a connection across the then open micro-switch 35. The micro-switch 35 is thereafter closed by the high point of the cam 30 turning beyond the lever-end 33 (and thus permitting the micro-switch 33 to close under the influence of its switch-closing spring), and thereafter, the read-out switch is opened (with the continued rotation of the programmer to which the read-out switch is connected or of which it is a part), so that the high point of the cam 30 will again stop the motor 27 on the completion of one revolution of the shaft 29.

The cam 26 is so shaped that the difference in the radial dimension of the low point 37 thereof and the radial dimension of the high point 38 thereof will be sufficient to vary the position of the pilot flapper valve of the pneumatic-transmitter 20 from the minimum to the maximum counterpressure or sweep-pressure above indicated. Thus, for instance, the low point 37 is arranged (in relation to the overall or effective moment-arm of the lever 24 and the linkage intervening it and the flapper of the transmitter 20), that the flapper will thereby be set to cause the output-pressure delivered by the transmitter 20 to be three pounds per square inch. The high point 38 is so set (also in relation to such effective moment-arm) as to position said flapper so as to cause the output-pressure of the transmitter 20 to be fifteen pounds per square inch. These minimum and maximum counter-pressures may be changed, according to the threshold value of the measurement-pressures and the maximum value of the measurement-pressures supplied to the measurement sides 14 of the comparator-switches 11.

The shape of the cam 26, between the low point 37 and the high point 38 thereof, may be such as to make the change in radius between any two points on the cam surface linearly proportional to the angle between such points. Such linear cam is used whenever the measurement-pressure applied to the measurement sides 14 of the comparator-switches 11 are linearly proportional to the measurement. If the measurement-pressures applied to the measurement sides 14 of the comparator switches 11 bear some other mathematical relationship to the measurements reflected thereby, then the cam-surface between the low point 37 and the high point 38 is correspondingly shaped, or shaped according to the same mathematical relationship as that between the measurement M and the measurement-pressure $p_0$. Thus, for instance, if the measurement-pressure $p_0$ varies as the square of the measurement M reflected thereby then the difference between the radii of any two points on the cam 26 is made as the square of the angular displacement $\phi$ between such two points. By this means the pressure-increments of the sweep-pressure $p_s$ are made linearly proportional to increments of sweep-time $t$ or proportional thereto in some other relationship, so that the increments of potential change (into which sweep-time is translated) will be correspondingly proportional to the true level of the measurement M, namely, $p_0=M^2$ and $p_s=t^2=\phi^2$. When $p_s=p_0$ then $M^2=t^2=\phi^2$. $\therefore M\equiv t\equiv\phi$.

The minimum counter-pressure of the transmitter 20 (as, for instance, the three pounds per square inch, mentioned above) is selected to be equal to the threshold pressure or the null pressure of the pneumatic transmitters which transmit the measurement-pressures (responsive to the respective measurement-sensing elements) to the measurement sides 14 of the comparator switches 11. The maximum pressure (as, for instance, the fifteen pounds per square inch, mentioned above) of the pneumatic transmitter 20 is selected to be equal to or slightly greater than the maximum measurement-pressures delivered to the measurement sides 14 of the comparator-switches 11.

The diaphragm (or other movable pressure-responsive element) 13 carries or is connected with a shorting bar or movable switch-element 40. A pair of electrical contacts 41 and 42 may be juxtaposed to the switch-element 40, and adapted to be contacted thereby so as to form an electrical circuit therethrough whenever the measurement-pressure is slightly (0.01 p.s.i.) greater than the counter-pressure; said circuit being opened whenever the counter-pressure is greater than the measurement-pressure.

Figure 1:
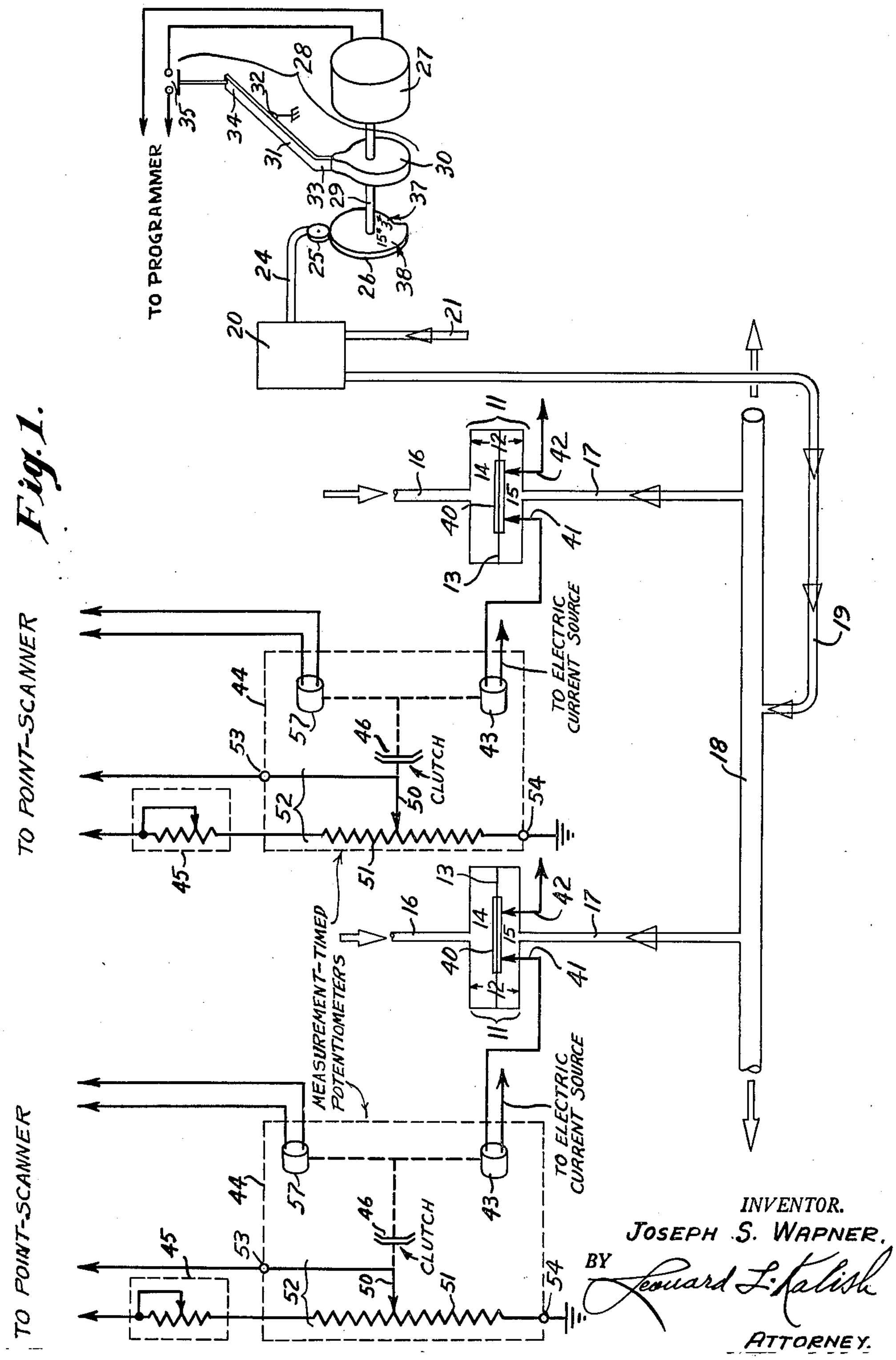
FIGURE 1 represents a diagrammatic or schematic view of one embodiment, namely, the "read-out" embodiment of the present invention.
Figure 2:
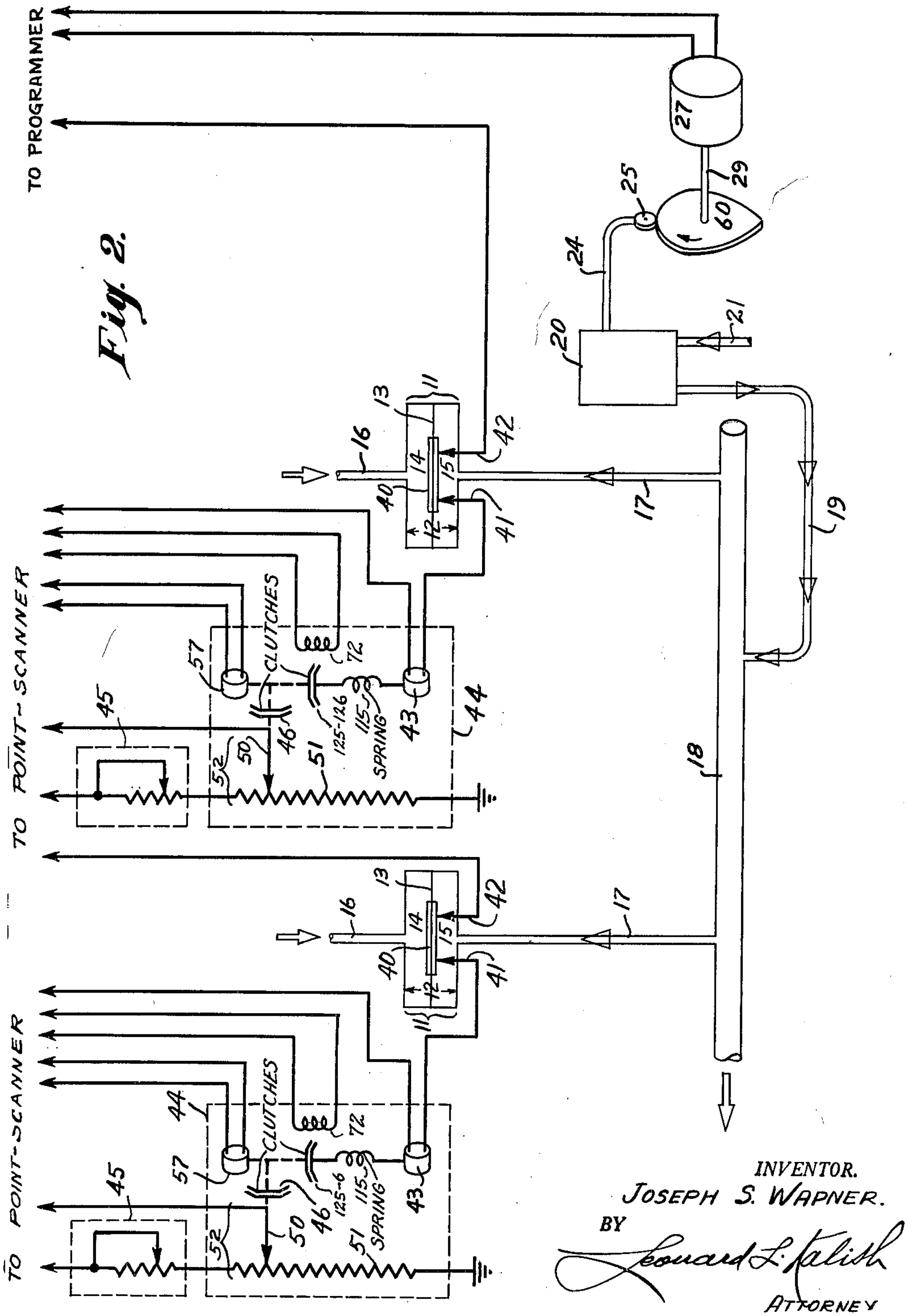
FIGURE 2 represents a diagrammatic or schematic view of another embodiment, namely, the "integrating" embodiment of the present invention.

A motor driven and reset potentiometer unit, designated generally by the numeral 44, and shown in detail in FIGURES 3 to 9, inclusive, and shown schematically in FIGURES 2 and 10, is provided for (and connected with) each comparator-switch 11. A manually adjustable range-adjusting potentiometer shown schematically in FIGURES 1, 2 and 10, and designated generally by the numeral 45, is also provided for each comparator-switch 11.

Each potentiometer unit 44 includes a self-starting synchronous motor 43. One side of each motor 43 is connected to one of the contact-elements of the corresponding to comparator-switch 11. Motor 43 is connected (through gear-train described hereinafter) with the measurement-timed potentiometer 52 (described hereinafter) to advance it throughout the periods during which the comparator-switch is closed, while current is applied. One side of the so connected motor-and-switch is connected to a source of alternating current while the other side thereof is connected to a read-out contact or terminal of the programmer in the case of the read-out embodiment of the present invention shown in FIGURE 1 or to the other side of the alternating current source in the case of the integrating embodiment of the present invention shown in FIGURE 2.

The synchronous motor 43 is connected, through a suitable shaft (with or without intervening gearing) to one side of a suitable slip-clutch 46 (FIGURE 1). The other side of the slip-clutch 46 is connected to the arm or movable element 50 of the potentiometer (or rheostat) 52 (FIGURE 1) so as to move the arm 50 along the resistance element 51 of the multi-turn potentiometer 52 having a voltage thereacross, from the constant-voltage source 55 (FIGURE 10), so that the movement of the arm or resistance-varying element 50 of the potentiometer 52 will vary the voltage-drop between the terminals 53 and 54 of the potentiometer 52. To vary the range, the potentiometer 45 is manually set to a value corresponding to the range desired (FIGURE 10).

The terminals 53 and 54 may be connected to any electrical signaling device capable of giving a variable signal proportional to voltage applied thereto. Thus, the output terminals 53 and 54 of the potentiometer 52 may be connected to a digital coding typewriter or tape-punching apparatus or other digital recording apparatus or may be stored, interim, or any electrical signal-storing means, such as a magnetic tape or the like. The voltage or potential drop across the output terminals 53 and 54 of the potentiometer 52 is translated into a digital value and such digital value may be typed on a data-sheet or punch on a tape or card or otherwise recorded (see FIGURES 10–12).

Each unit 44 also includes a reset motor 57 connected to the slip-clutch 46 of the measurement-timed potentiometer 52, but arranged to move the slider 50 thereof in a direction opposite to the motion imparted thereto by the motor 43; thereby to reset the potentiometer 52 to its zero or threshold position after each read-out in the embodiment shown in FIGURE 1 or at the end of each integrating-period in the integrating embodiment of the invention shown in FIGURE 2. The reset motor 57 is connected to a contact of the read-out timer of the programmer, so as to be energized after each read-out in the embodiment in FIGURE 1 and to be energized at the end of each integrating-period in the embodiment in FIGURE 2; the reset motor 57 being so energized for a length of time sufficient to return the slider 50 of the potentiometer 52 from its position of maximum displacement to its zero position (the slip-clutch 46 protecting the potentiometer against excess return mtoion).

At each read-out (as, for instance, on the stroke of every hour) the synchronous motor 27 (which, together with the pneumatic transmitter 20 and the cam 26 and the clutch 28 may be regarded as constituting a sweep-pressure generator) is energized by a suitable contact or contacts or a circuit-closer of or operated by the programmer. At the same time an alternating current (suitable for the operation of the synchronous motors 43) is applied to all the synchronous motors 43, by a suitable contact or circuit-closer of (or operated by) the programmer. This sets into operation all the synchronous motors 43 which, in turn, move or displace the corresponding sliders 50, the potentiometers 52, and such sliders are moved until the sweep-pressure developed by the pneumatic transmitter 20 rises to a point just sufficient to overcome or overbalance the respective measurement-pressures applied to the corresponding comparator-switches 11 through the respective lines 16; at which overbalancing, the switches 11 are opened and the motors 43 stopped. In this manner each of the potentiometers 52 is set to a value proportional to the length of time it required the sweep-pressure to reach the measurement-pressure in each of the comparator-switches 11, and hence proportional to the level of the respective measurements.

Immediately upon the completion of the single sweep or cycle of the counter-pressure supplied by the transmitter 20 (and hence after all the potentiometers have been thus "set" to points corresponding to the respective levels of measurements) the selector switch or switches of the programmer, to which the potentiometers 52 are connected, sequentially connects each of the potentiometers 52 to a self-balancing potentiometer 56 (as, for instance, the Leeds & Northrup Company's "Speedomax" potentiometer), whose mechanical output element 58 is thereby "set" to a position corresponding to the potential of the particular potentiometer 52 so connected thereto by the selector-switch of the programmer.

The position of the output shaft 58 of such self-balancing potentiometer 56 is imposed upon a digital coder (as, for instance, the aforementioned "Digi-Coder" of the Fischer & Porter Company), which translates the position of such self-balancing potentiometer into a corresponding digit by the selection of correspondingly coded electrical circuits. These output circuits of the digital coder are connected to an electrical typewriter operable by such circuits, as, for instance, the aforementioned "Flexowriter" of Commercial Controls Corporation.

After each of the potentiometers 52 has thus been connected to the aforementioned self-balancing potentiometer 56, and its potential has been so recorded, the reset motor 57 is energized through another contact or circuit-closer of (or operated by) the programmer, thereby to reset all the potentiometers 52 to their threshold portions. Thereafter, the read-out system (FIGURE 1) remains inoperative until the next read-out period, when all the aforementioned operations are repeated.

However, a "read-out" may also be effected intermediate the regular hourly read-out periods, either by manually closing one or (in sequence) several of the aforementioned circuits (including a comparator-switch 11 and units 44 and 45 and the sweep-pressure generator) or a read-out may be selectively yet automatically effected of one or more of the larger group of measurement-levels and switches 11, by separate abnormal-measurement sensing elements and circuits which will cause an instantaneous read-out (intermediate any two regular read-out periods) of any measurement whose level either rises above or falls below the range of variation regarded permissive or normal (or above or below a pre-set value).

In the integrating embodiment of the present invention, indicated in FIGURE 2, the cam 60 for operating the flapper of the pneumatic transmitter 20, is continuously driven by the synchronous motor 27 at, for instance, two revolutions per minute, so as to vary the counter-pressure in the manifold 18 from minimum to maximum and back to minimum, every half minute.

In the integrating embodiment of the present invention (shown in the diagrammatic or schematic drawing which is FIGURE 2) a memory-mechanism (described hereinafter) is interposed between the motor 43 and the slip-clutch 46, through which the potentiometer 52 is driven forwardly. The memory-mechanism includes a memory-spring interposed between the shaft of the motor 43 (or between a shaft geared thereto) and a spring-driven member and brake-member, whereby the motor 43 will drive the potentiometer through such spring so long as the brake is off, and will wind the spring when the brake is on, whereby, upon the subsequent release of the brake, the angular motor-displacement so stored in the spring will be applied, automatically, further to displace the potentiometer slider 50.

The forward-drive motor 43, the reset motor 57, and the potentiometer 52, and the drive and the brake intervening said motors and the potentiometer, and the solenoid for operating the brake, are preferably arranged in a unit, designated generally by the numeral 44 shown in FIGURES 3 to 9, inclusive.

Each of the units 44 includes a pair of similar frame-plates 101 and 102, between which the memory-mechanism as well as the differential drive mechanism (shown in FIGURE 7) are mounted. The forward-drive motor 43 is attached to the plate 102. The reset motor 57 is secured to the plate 101. The potentiometer 52 is secured to a frame-plate or member 100 intervening plates 101 and 102.

Figure 5:
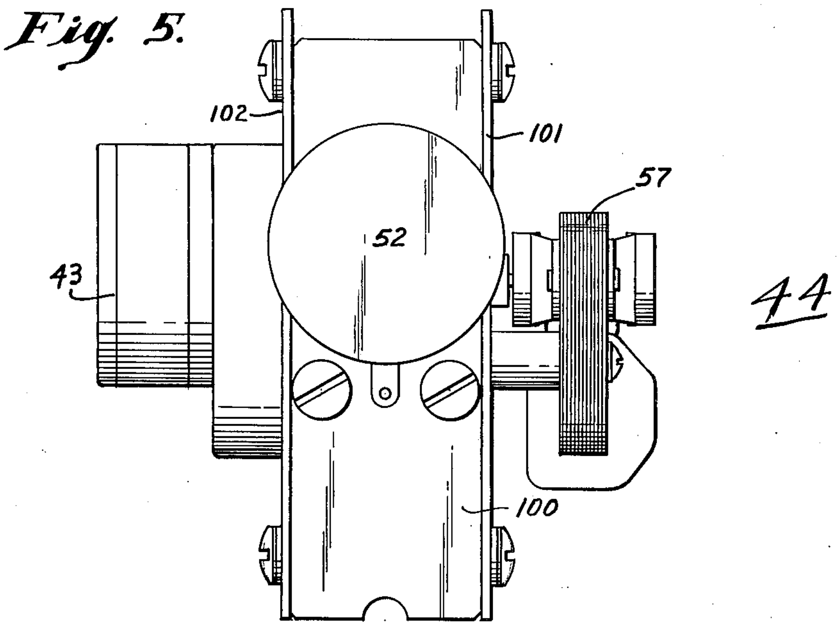
FIGURE 5 represents an opposite end view of the same; as viewed at 180° from the view shown in FIGURE 3, or as viewed on line 5—5 of FIGURE 4.
Figure 6:
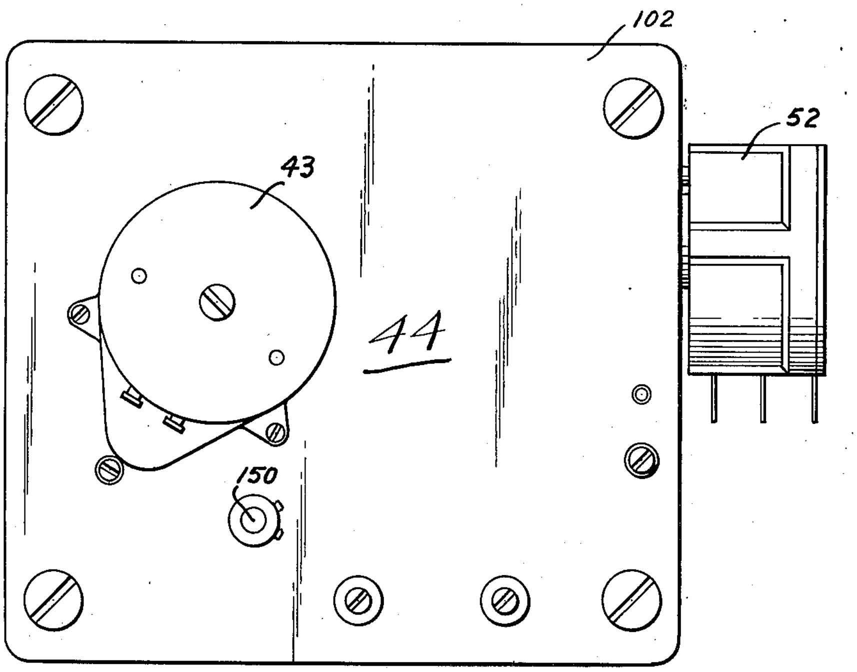
FIGURE 6 represents a side view on line 6—6 of FIGURE 3.
Figure 7:
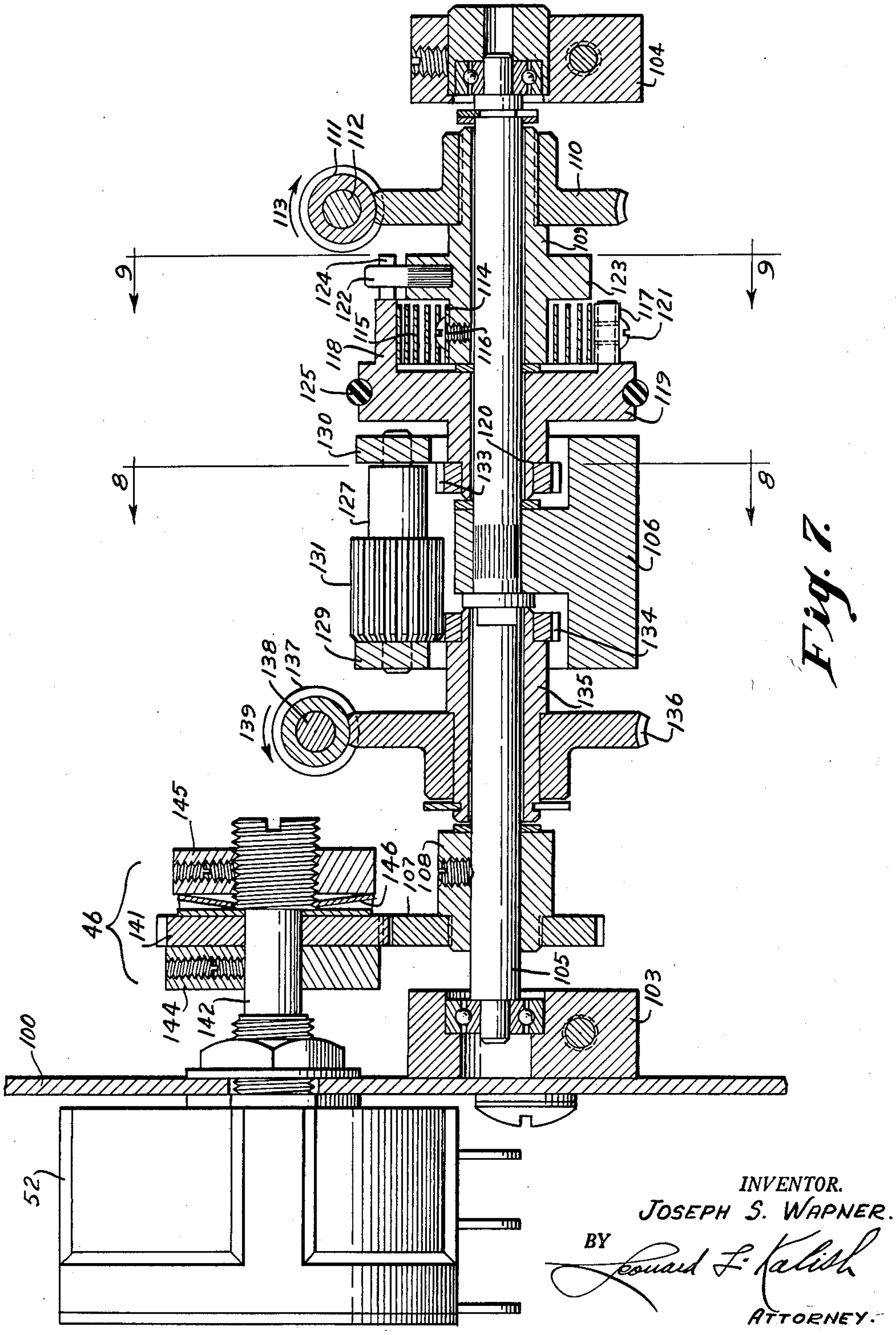
FIGURE 7 represents a cross-sectional view of the differential gear-train and memory mechanism shown in FIGURE 4, on an enlarged scale.

Between the plates 101 and 102 the bearing-blocks 103 and 104 are mounted and secured, in which blocks the differential shaft 105 is journaled, as indicated in FIGURES 5 and 7.

To the shaft 105, the cage 106 of the differential gear-train is non-revolubly secured. The output-gear 107, carried by its hub 108, is likewise non-revolubly secured to the shaft 105.

A bushing 109 is revolubly journaled on the shaft 105. To the bushing 109 the forward-drive worm-gear 110 is non-revolubly secured. A screw-type worm 111, whose worm-thread has what is conventionally called a "right-hand" thread, is carried by and secured to the countershaft 112 of the forward-drive synchronous motor 43, and is in mesh with the worm-gear 110, and rotates in the direction of the arrow 113 when the switch 11 is closed so as to cause the rotation of the motor 43.

To the bushing 109 the inner end 114 of the turn-accumulator or memory-spring 115 is secured by means of the screw 116 (or by any other suitable means). The outer end 117 of the spring 115 is extended through a slit in the cylindrical spring-housing 118 and is secured by means of the screw 121 (or by any other suitable means) to the spring-housing 118. The spring-housing 118 is formed integrally with or is affixed to the brake-wheel 119 and gear-hub 120; which are revolubly journaled on the shaft 105.

A radial stop-pin 122 is provided in the flange 123 of the bushing 109, and a lateral stop-lug 124 is provided integrally with or secured to the spring-housing 118. The spring 115 is so arranged between its aforementioned inner and outer anchorages, as to tend to rotate the spring-housing 118 (and hence the brake-wheel 119 and pinion-hub 120) in relation to the hub 119 and worm-gear 110 until the lug 124 contacts the stop-pin 122 (as indicated in FIGURE 9), whereby the counter-clockwise rotation of the hub 119 and worm-gear 110 (as viewed in FIGURE 9) will cause the spring-housing 118 and pinion-hub 120 and brakewheel 119 also to rotate in the same direction so long as the latter are free to rotate; the turning force being transmitted from the hub 109 to the spring-housing 118 through the spring 115.

Figures 3, 4:
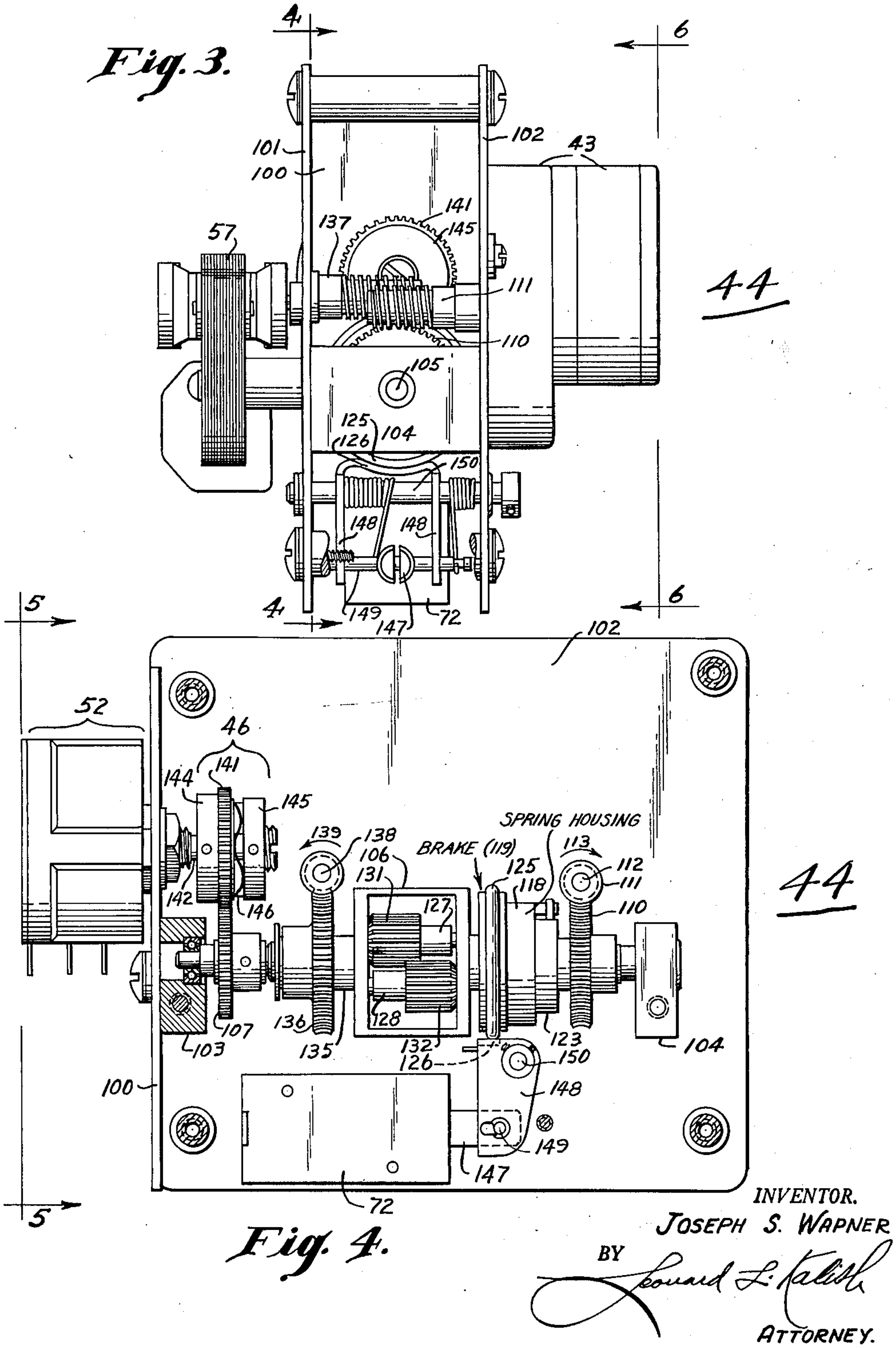
FIGURE 3 represents an end view of one of the motor-drive-potentiometer mechanisms embodying one phase or aspect of the present invention.
FIGURE 4 represents a side view, on line 4—4 of FIGURE 3, namely, with one of the frame-plates removed and with the reset-motor (carried by the so removed frame-plate) also removed, so as to expose to view the differential gear-train and memory mechanism intervening the two motors and the potentiometer driven thereby.

A frictional brake-ring 125 is mounted on or affixed to the outer periphery of the brake-wheel 119 in the manner indicated in FIGURES 4 and 7. When the brake-shoe 126, actuated by the memory-solenoid 72 (FIGURE 4) is pressed against the ring 125 (thereby preventing rotation of the spring-housing 118 of the pinion-hub 120), the spring 115 is wound up by any continued rotation of the worm-gear 110 and hub 109.

The differential gear cage 106 has two pinion-shafts 127 and 128 (FIGURE 8) disposed between and journaled in the flanges 129 and 130 thereof. The shaft 127 carries the pinion 131, while the shaft 128 carries the pinion 132. The overlapping or co-extensive portions of the pinions 131 and 132 are in mesh with each other, as indicated in FIGURE 4. The opposite or outer end of the pinion 132 is in mesh with the pinion 133 carried by and affixed to the hub 120, while the opposite or outer end of the pinion 131 is in mesh with a similar pinion 134 carried by and affixed to the gear-hub 135 which is freely journaled on the shaft 105, and to which (hub 135) the worm-gear 136 is affixed.

Figure 8:
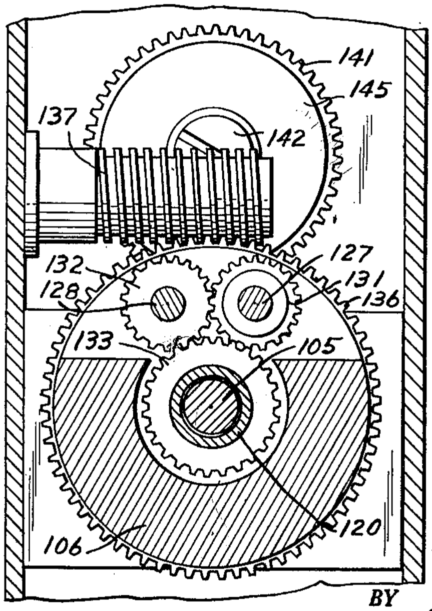
FIGURE 8 represents a section on line 8—8 of FIGURE 7.

A right-hand screw-worm 137, carried by the shaft 138 of the reset motor 57, and rotating counter-clockwise (as viewed in FIGURE 7), namely, in the direction of the arrow 139, is in mesh with the worm-gear 136, so as to drive the worm-gear 136 in a clockwise direction (as viewed in FIGURES 8 and 9).

When the worm 137 is stationary, it acts as a brake on the worm-gear 136 and pinion 134 so as to prevent their rotation. Similarly, when the worm 111 is not driven by the motor 43, it acts as a brake on the worm-gear 110 and pinion 133 to prevent the counter-clockwise rotation of the pinion 133 (by contact between the stop-pin 122 and stop-lug 124).

Hence, the counter-clockwise rotation of the pinion 133 (FIGURES 8 and 9), while the pinion 134 is held stationarily by the worm 137, will cause the cage 106 and hence the shaft 105 and output-gear 107 to rotate counter-clockwise (FIGURES 8 and 9); thereby imparting a clockwise rotation (in the direction of the arrow 140 in FIGURES 3, 8 and 9) to the gear 141 which is journaled on the shaft 142 of the potentiometer 52 (FIGURES 4 and 7) and which is in mesh with the output-gear 107. When the reset motor 57 is energized, to turn the worm 137 in the counter-clockwise direction 139 (FIGURE 7) and to turn the worm-gear 136 in the clockwise direction (FIGURE 8), while the pinion 133 is held stationarily by the worm 111 (which worm 111 is stationary during re-set), the cage 106 is caused to turn in the clockwise direction (FIGURE 8); thereby imparting a clockwise rotation to the shaft 105 and out-put gear 107 and a counter-clockwise rotation to the gear 141, thereby to turn it and the shaft 142 of the potentiometer 52 in the re-set direction indicated by the arrow 143.

The potentiometer-shaft 142 has a pair of clutch-discs or flanges 144 and 145 affixed thereto (by suitable set-screws or by other means), and between one or the other of these discs and the side of the gear 141 an axially compressible waved annular spring 146 is interposed (under suitable compression), resiliently to press the side-wall of the hub of the gear 141 against the other disc (144), thereby to impose an adequate driving friction between the side-wall of the hub of the gear 141 and the disc 144. In this manner the shaft 142 of the potentiometer 52 (which carries the resistance-varying arm, brush or "slider" of the potentiometer) is given a clockwise or forward rotation when turned by the forward-drive motor 43 and is given the counter-clockwise or re-set rotation when turned by the re-set motor 57.

When the brake-wheel 119 and spring-housing 118 are stopped by the memory-solenoid 72, during read-out, while the forward-drive motor 43 is energized, the spring 115 is wound up. When, upon completion of the read-out, the brake-shoe 126 is withdrawn from the brake-ring 125, the pinion 133 and hence the potentiometer-shaft 142 are given the forward rotation corresponding to the angular displacement between the pin 122 and lug 124; this forward drive being by the energy stored up in the spring 115. At the same time any forward drive of the worm-gear 110 is also transmitted to the potentiometer-shaft 142.

The plunger 147 of the memory-solenoid 72 is pivotally connected to a pair of arms 148 (one above the other, as viewed in FIGURE 4), through the pivot-pin 149; the arms 148 being in turn pivoted at 150. The brake-shoe 126 may be carried by the arms 148 in the manner indicated in FIGURE 4, so that when the plunger 147 is pulled into the solenoid 72 (when the latter is energized), the brake-shoe 126 is pressed against the brake-ring 125 (of rubber or other frictional material).

When the units 44 (as shown in FIGURES 3 to 7, inclusive) are used in the integrating embodiment shown in FIGURE 2, all the elements of such units 44 (above described) are utilized. When the units 44 are used in the read-out embodiment shown in FIGURE 1, the memory-spacing 15, the brake-wheel 119, the spring-housing 118 and the memory-solenoid 72 (and the related elements 126 and 149—150) may be omitted, and the pinion 133 may then be affixed directly to the hub 109.

The potentiometer 52 may be any standard or conventional potentiometer, as, for instance, that shown in U.S. Patent 2,473,048, a commercial form of which is known as the Beckman "Helipot," made by the Helipot Corporation of South Pasadena, Calif.

As shown in FIGURES 10 and 11, as each measurement-timed potentiometer 44 (and the corresponding range-adjustment potentiometer 45 connected in series therewith) is connected (in succession) to the self-balancing potentiometer 56, through the selector or scanning switch or point-scanner stepping-switch 151, it becomes one leg of the Wheatstone bridge forming a part of the self-balancing potentiometer 56 (FIGURES 10 and 11), causing the latter (56) to come to its null position. When this null position is reached, the digital circuit (or circuits) 153 of the analog-to-digital converter 152 determined by the null position of the shaft 58 of the potentiometer 56 is (or are) energized, and a typewriter and/or card-puncher (or tape-puncher) 156 is thereby operated, either directly or through a decoder 154 and decoded circuits 155.

When it is desired to obtain the average of the integrated measurements accumulated on the potentiometer 52 at any instance intermediate the read-out (as, for instance, the hourly) periods of such integrated measurements, a time-integrator potentiometer unit designated generally by the numeral 44–I is interposed between the slider of the self-balancing potentiometer 56 and the measurement-potentiometer 52. The time-integrator unit 44–I is like the measurement-timed potentiometer unit 44 shown in FIGURES 3 to 9, inclusive, and includes a synchronous motor driven potentiometer 52–I and a reset motor 57, but without the memory-spring and memory-solenoid and associated brake elements. Such motor driven potentiometer 44–I (and 52–I) is operated continuously (through suitable contacts on the point-scanner stepping-switch 151 or on the program-timer 158); with its threshold-position and its terminal-position and re-set time corresponding (time-wise) to the threshold-position, terminal-position and re-set time of the potentiometer 44 (and 52).

By the interposition of such time-integrator potentiometer unit 44–I (in the manner aforesaid and as indicated in FIGURES 10 and 11), the null position or balance position (at any instant) of the self-balancing potentiometer 56, will indicate the average of the integrated measurements accumulated on the potentiometer 52, as, for instance, the average rate-of-flow between the last previous re-set and the instance when such average integrated measurement is read out. The operation of the circuit shown in FIGURE 10 is as follows:

$$E_1=\frac{R_2}{R_1}E$$

$$E_2=E_s(T)$$

where $T$=time in terms of 0–1 hour at balance $E_1=E_2$. Therefore $$\frac{R_2}{R_1}E=E_s(T)$$

and $$\frac{E_s}{E}=\frac{R_2}{R_1}\frac{1}{T}$$

As it is the $E_s$ value which is "read out" and applied to the analog-to-digital converter 152 through the corresponding null position of the arm or shaft 58 of the self-balancing potentiometer 56, the time-average of the integrated measurements up to the instance of read-out, is thereby impressed on the analog-to-digital converter 152. The point-scanner 151 (FIGURE 12) may be a stepping switch (or several stepping switches), such as, for instance, the type 45 stepping switch of the Automatic Electric Corporation of Chicago, or the type 26 stepping switch of the C. P. Clare & Company of Chicago.

The analog-to-digital converter 152 (indicated in the block-diagram which is FIGURE 12) may be the aforementioned converter of co-pending application Serial No. 399,269 or of co-pending application Serial No. 437,991 or any other suitable (coding or non-coding) analog-to-digital converter.

Such analog-to-digital converter 152 has the rotation (or other motion) of the shaft or other mechanical-output member 58 of the self-balancing potentiometer 56 as its input. The motion of the member 58 turns (or otherwise moves) one or several sets of digital discs (or other pattern or configuration members) whose peripheries are recessed in accordance with the direct-digital or coded-digital electrical circuits desired. A bank of feeler-fingers is moved (generally radially) into engagement with these discs or members. Such feeler-fingers or feelers in turn are connected to or form a part of corresponding electrical switches which are either of the normally open or normally closed type (or which, in a few instances, may be single-pole double-throw switches which close one circuit and open the other in one position and open the first circuit and close the second circuit in the other position). The recesses in the digital-discs leave the switches unaffected, whereas un-recessed portions of the discs operate the corresponding switches when the bank of feelers is brought into engagement with the discs.

The shaft of the discs (or a shaft geared thereto) carries a toothed fraction-resolving disc or gear with sharp pointed teeth of generally V-shape. Simultaneously with (or slightly in advance of) the disc-approaching motion of the feelers, a fraction-resolving or centering blade or sharped-edge pawl is pressed into engagement with the sharp-toothed fraction-resolving disc or gear, so as to bring the latter and all the (coded or non-coded) digital-discs connected therewith, to a digital position nearest to the analog position of the shaft 58 of the self-balancing potentiometer 56 when it comes to rest in its null position.

The digital-discs of the analog-to-digital converter 152 may be notched to operate the feeler-actuated switches in a direct digital decimal relationship (without any coding) or they may be notched to operate the feeler-actuated switches according to any predetermined digital code, such as a direct binary or a binary-decimal code (or any other code) whose circuits will then produce a set of decimal-signal circuits 155 (when de-coded, by relay-operated de-coding circuits of the de-coder 154, if the circuits 153 are coded); the de-coder 154 being (in one form) composed of a set of relays operated by the code-circuits 153 of the analog-to-digital converter 152, whose contacts (operated by such relays) produce selective circuits 155 representing true decimals according to the combination or permutation of the circuits 153 energized by the analog-to-digital converter 152.

In the block-diagram which is FIGURE 12, the several electrical circuits which are the output of the analog-to-digital converter 152 are represented by the multi-conductor cable 153. As mentioned above, this may include a separate circuit for each figure from 0 to 9, together with an additional circuit representing the position of the figure, namely, whether it is in the units position, tens position, hundreds position or thousands position (whereby the typewriter-carriage is shifted by one position for the sequential read-out of the thousands figure, the hundreds figure, the tens figure and the units figure), or these circuits may be the circuits representing a binary-decimal system or configuration, as for instance, circuits representing 1, 2, 4 and 8, which circuits, energized individually or in combinations with each other, can then represent any number from 0 to 9.

If either direct binary or a binary-decimal coded circuits are the output of the analog-to-digital converter 152, then these circuits are applied either directly or through division and/or multiplication circuits, to the decoder circuits of 154. The decoder 154 may consist of a series of relay-operated decoding-switches whose relays are connected to the output circuits of the analog-to-digital converter 152 either directly or through division-circuits and/or multiplication circuits (included in the decoder 154) preceding the decoding-switches, whereby the binary decimal value of the output-circuits 153 of the analog-to-digital converter 152 are divided by two or four (or eight) and/or multiplied by 10, 100 etc., and the so-divided and/or multiplied coded binary value is then applied to the decoder circuits (of 154), thereby permitting the use of a larger percentage of the turn of the shaft 58 of the self-balancing potentiometer 56 even for small ranges of measurement; the stepping switch or switches by which the successive points-of-measurement units 44 are sequentially connected to the self-balancing potentiometer 56, also including relay-operated contacts or switches whereby one or the other of several division-circuits and/or multiplication-circuits may be energized, so as to connect the binary circuits 153 of the analog-to-digital converter 152 either directly or in any of these divisional and/or multiple ratios, of 154, to the decoder circuits.

The output circuits 155 of the decoder 154 are either separate circuits for each number from 0 to 9, or are another set of coded circuits. Thus a "direct" set of 0 to 9 circuits may be produced, and applied directly to an electric typewriter and/or tape or card puncher 156, with each of such ten circuits separately connected to a solenoid or other electro-mechanical means operating the 0 to 9 keys of the typewriter, or the circuits 155 may be coded circuits corresponding to the circuit-code of any special typewriter, such as a teletypewriter or the aforementioned "Flexowriter."

If desired, both a typewriter and a tape-puncher (or card-puncher) may be connected to the digital circuits, namely, either to the digital circuits 153 which are the output of the analog-to-digital converter 152, or to the circuits 155 which are the output of the decoder 154 (which may include divisional and/or multiplying circuits). In either event, namely, whether a typewriter 156 and/or a tape or card puncher 156 is used a micro-switch is included (in the typewriter and in the tape or card puncher) so that when the key of the typewriter or the puncher of the punching apparatus has been energized, for printing or punching the last digit of a read-out number of one measurement-point or measurement-station, the stepping solenoid of the point-scanner 151 will be energized, so as to shift or move the stepping switch (which is the scanner) to the next pulse-duration to voltage unit 44 of the next point-of-measurement.

A clock-operated multi-contact timing-switch or program-timer 158 is connected, through the electric circuit 159, to the stepping-switch or stepping-switches which constitute the point-scanner 151, so that periodically (as, for instance, at the beginning of every hour) the stepping switch 151 is moved into its first scan-point position; from which it is then advanced from scan-point to scan-point by the aforementioned micro-switch of the read-out typewriter 156 or of the readout card-puncher or tape-puncher 156, through the feed-back electrical connection 157. A program-timer 158 is also connected, through a set of electrical contacts and the circuit 160, to the cyclic sweep-pressure generator (FIGURE 12), so that either simultaneously with or slightly in advance of the setting of the stepping-switch 151 into its first scan-point position (by the program-timer) the cyclic sweep-pressure generator will be started. This circuit 160, which energizes the cyclic sweep-pressure generator, then operates the synchronous motor 27 (FIGURE 1 or 2) in the manner described above (in respect to FIGURES 1 and 2, respectively).

The stepping-switch or stepping-switches 151 may be of any suitable type or form as, for instance, type 45 stepping-switches of the Automatic Electric Company of Chicago.

In addition to the division-circuits of 154, the binary values of the energized output-circuits 153 of the analog-to-digital converter 152 (or the divisions of such values) may be multiplied by multiplying circuits, which multiply them by 10, 100 or 1000, or they can be divided by 10, 100 or 1000, by merely shifting the read-out of such value forwardly or backwardly, namely from the units position toward the thousands position, or in the opposite direction.

The present invention may be embodied in other specific forms without departing from the spirit or essential attributes thereof, and it is therefore desired that the present embodiments be considered in all respects as illustrative and not restrictive, reference being had to the appended claims rather than to the foregoing description to indicate the scope of the invention.

Having described the invention, the following is claimed:

1. An electro-pneumatic system for taking periodic readings of the level of a process-measurement or other measurement, including a pressure-operated electric switch, opposed pneumatic means in operative juxtaposition to said switch and arranged to open said switch when the effective forces of pneumatic pressures applied to said two means are unbalanced in one direction and to close said switch when unbalanced in the other direction, one of said two opposed pneumatic means being connected to a pneumatic line whose pressure-level is proportional to or represents the level of the measurement to be read, a cyclic sweep-pressure generator connected to the other of said two opposed pneumatic means, arranged to generate a pneumatic pressure cyclicly varying proportionately to time, from a null or threshold pressure to the maximum of the aforesaid measurement pressure, and electrical means operable by said switch for varying an electrical characteristic of an electrical signal-circuit in proportion to the time required for the sweep-pressure to balance the measurement-pressure.

2. An electro-pneumatic system for taking periodic readings of the level of a process-measurement or other measurement, including a pressure-operated electric switch, two opposed pneumatic means in operative juxtaposition to said switch and arranged to open said switch when the effective forces of pneumatic pressures applied to said two means are unbalanced in one direction and to close said switch when unbalanced in the other direction, one of said two opposed pneumatic means being connected to a pneumatic line whose pressure-level is proportional to or represents the level of the measurement to be read, a cyclic sweep-pressure generator connected to the other of said two opposed pneumatic means, arranged to generate a pneumatic pressure cyclicly varying proportionately to time from a null or threshold pressure to the maximum of the aforesaid measurement-pressure, and electrical means operable by said switch for varying an electrical characteristic of an electrical signal-circuit in proportion to the time required for the sweep-pressure to balance the measurement-pressure, and means for resetting said electrical means after the sweep-pressure has balanced the measurement-pressure and after the resultant electrical characteristic has been read or recorded.

3. An electro-pneumatic system for taking periodic readings of the level of a process-measurement or other measurement, including a pressure-operated electric switch, two opposed pneumatic means in operative juxtaposition to said switch and arranged to open said switch when the effective forces of pneumatic pressures applied to said two means are unbalanced in one direction and to close said switch when unbalanced in the other direction, one of said two opposed pneumatic means being connected to a pneumatic line whose pressure-level is proportional to or represents the level of the measurement to be read, a cyclic sweep-pressure generator connected to the other of said two opposed pneumatic means, arranged to generate a pneumatic pressure varying proportionately to time, from a null or threshold pressure to the maximum of the aforesaid measurement-pressure, and electrical means operable by said switch for varying an electrical characteristic of an electrical signal-circuit in proportion to the time required for the sweep-pressure to balance the measurement-pressure, and means for temporarily arresting and storing the effect of said electrical means during one or more cycles of said sweep-pressure generator, so that the variation of such electrical characteristic is temporarily stopped notwithstanding that the unbalance of said pneumatic means calls for continued variation of said electrical characteristic, and means for releasing the so stored effect and applying it to change said electrical characteristic in proportion to the amount of the so stored effect.

4. An electro-pneumatic system for taking period readings of the level of a process-measurement or other measurement, including a pressure-operated electric switch, two opposed pneumatic means in operative juxtaposition to said switch and arranged to open said switch when the effective forces of pneumatic pressures applied to said two means are unbalanced in one direction and to close said switch when unbalanced in the other direction, one of said two opposed pneumatic means being connected to a pneumatic line whose pressure-level is proportional to or represents the level of the measurement to be read, a cyclic sweep-pressure generator connected to the other of said two opposed pneumatic means, arranged to generate a pneumatic pressure cyclicly varying proportionately to time, from a null or threshold pressure to the maximum of the aforesaid measurement pressure, and electrical means operable by said switch for varying an electrical characteristic of an electrical signal circuit in proportion to the time required for the sweep-pressure to balance the measurement-pressure, and means for temporarily arresting and storing the effect of said electrical means during one or more cycles of said sweep-pressure generator, so that the variation of such electrical characteristic is temporarily stopped notwithstanding that the unbalance of said pneumatic means calls for continued variation of said electrical characteristic, and means for releasing the so stored effect and applying it to change said electrical characteristic in proportion to the amount of the so stored effect, and means for resetting said electrical means after the sweep-pressure has balanced the measurement-pressure and after the resultant electrical characteristic has been read or recorded.

5. An electro-pneumatic system for taking period readings of the levels of process-measurements or other measurements, which system includes a pneumatically operated pneumatic pressures applied to said two pneumatic chambers, so that the switch will be closed when the two opposed pressures are unbalanced in one direction and opened when they are unbalanced in the other direction, electrical switch (for each measurement to be read) having two pneumatic chambers and being responsive to the one of said pneumatic chambers being connected to a pneumatic line whose pressure-level is proportional to or represents the level of the measurement to be read and the other pneumatic chamber being connected to a pneumatic transmitter arranged to deliver a cyclically varying pneumatic counter-pressure between a minimum value sufficient to counter-balance the minimum or null value of the measurement-pressure and a maximum value sufficient to counter-balance the maximum value of the measurement-pressure, a potentiometer including a movable element for varying the potential thereof, an electric motor arranged to displace the movable element of said potentiometer proportionately to time, in a forward or measurement-reading direction, an electric motor for resetting said movable element of the potentiometer, and an electrical energizing circuit including the aforementioned switch, arranged to render said first-named motor operative to displace the movable element of said potentiometer upon an unbalance of said pneumatic pressures.

6. A logging system for taking periodic readings of the levels of measurements, which system includes an electrical switch (for each measunement-sensing element or station) responsive to fluid pressure applicable thereto from two opposite directions, namely, a measurement-indicating pressure and a counter-pressure, so that the switch will be closed when the measurement-pressure is slightly greater than the counter-pressure and will be open when the counter-pressure is slightly greater than the measurement-pressure, the measurement side of said switch being connected to a fluid-pressure line whose pressure-level is proportional to or represents the measurement-level and the counter-pressure side of said switch being connected to a pneumatic transmitter capable of delivering a counter-balancing fluid-pressure varying with time between a minimum value and a maximum value such that at its minimum value it will be slightly less than or of the same order as the minimum measurement-pressure or the null or threshold value of the measurement-pressure and so that its maximum value will be greater than or of the same order as the maximum measurement-pressure, a timer for gradually causing the aforementioned pneumatic transmitter (which supplies the counter-pressure to the switch) to deliver a pneumatic counter-pressure from the minimum value to the maximum value of such counter-pressure over a pre-determined length of time with the pressure-variation (or with the successive increments of pressure) in pre-determined relationship to time, an electrical energizing circuit connected through said switch, an electrical drive in said electrical circuit for mechanically moving a measurement-indicator to a value-position corresponding to the length of time during which the switch is closed, whereby the measurement-level at the station to which the switch is connected (through its measurement-indicating fluid-pressure line) can be read either at intervals chosen by the operator or at regular pre-determined intervals fixed by an automatic timer which causes the counter-pressure-transmitter to go through a cycle of pressure variation at pre-determined timed intervals, and which also energizes the aforementioned electrical circuit.

7. A measurement-recording system including a plurality of measurement-sensing means, a corresponding plurality of pneumatic transducers operatively connected with said measurement-sensing means (one pneumatic transducer being connected to each of said measurement-sensing means) to convert the sensed measurement into pneumatic pressure corresponding to the measurement-level, a corresponding plurality of pressure-comparators (one connected to each of said transducers), each of said pressure-comparators including a pressure-responsive movable element and a pair of opposed pneumatic-chambers operatively juxtaposed thereto, one of said pneumatic-chambers being connected to the corresponding pneumatic-transducer, a cyclically vared sweep-pressure generator connected to the other pneumatic chamber of each of said pressure-comparators, said sweep-pressure generator being arranged to generate a pneumatic pressure from a mnimum to a maximum corresponding generally to or slightly overlapping the minimum and maximum pneumatic pressures delivered by said transducers, with the increments of change of pressure of said generator being in predetermined relation to a selected increment of time, a switch operated by each of said pressure-responsive elements of said pressure-comparators, a plurality of pulse-duration crcuits, one such pulse-duration circuit connected through each of the aforesaid pressure-comparator switches and each of said pulse-duration circuits being arranged to be connected to a source of electric energy, whereby said circuits will be activated or deactivated for a portion of the total cycle-time (of said sweep-pressure generator) corresponding to the portion of such cycle-time during which the effective force of the sweep-pressure is less than or greater than the effective force of the measurement-pressure, a plurality pulse duration to voltage converters, one connected to each of said pulse-duration circuits, each of said converters including an electrical drive connected to such pulse-duration circuit and controlled thereby and including an electrical output circuit and means for progressively and incrementally varying an electrical characteristic of said output circuit, said means being operated by the aforesaid electrical drive, so that the amount of the variation of such electrical characteristic of said output circuit is proportional to the pulse-duration of the aforesaid pulse-duration circuit, an analog indicator for indicating the analog value of such output circuits, a point-scanner, said point-scanner being arranged sequentially to connect said output circuits to said analog indicator, said analog-indicator having a mechanical-output indicator-member, an analog-to-digital converter for converting the position of the latter to a digital value reflecting the position of said mechanical-output indicator-member, a program-timer connected to said point-scanner and to said sweep-pressure generator for starting same at predetermined intervals, read-out means connected to said analog-to-digital converter for more or less permanently recording the digital values thereof, and a feed-back circuit operatively interposed between said read-out means and said point scanner for stopping the scanner to the next point when the read-out of a point (of measurement) is finished.

8. The method of periodcally recording the levels of a plurality of variable measurements, which consists of sensing the measurement-level at each point of measurement, converting the measurement-sensing indicia into pneumatic pressures whose level reflects the corresponding measurement-level, converting the pneumatic measurement-pressures into time-factors whose length reflects the level of the corresponding original measurement, converting said time-factor into an electrical characteristic in corresponding electrical circuits, the magnitude or quantum of which characteristic reflects the level of the corresponding original measurement, impressing said electrical circuits on a self-balancing indicator of such characteristic, converting the null position of said self-balancing indicator into a digital value and causing such digital value to select the corresponding digital-printing means of a typewriter or other recorder such as a card or tape puncher.

9. A data-logging system including a plurality of measurement-level-sensing elements, pneumatic transducers for converting the sensed measurement-levels into pneumatic pressure-levels representing the measurement-levels, pressure-comparator switches connected on one side to said transducers and on the other side thereof to a cyclic sweep-pressure generator common to said comparator-switches, motor-operated measurement-timed potentiometers connected to said comparator-switches, a self-balancing potentiometer, a point-scanning step-switch intermediate said measurement-timed potentiometers and said self-balancing potentiometer and arranged sequentially to connect the former to the latter.

10. A data-logging system including a plurality of measurement-level-sensing elements, pneumatic transducers for converting the sensed measurement-levels into pneumatic pressure-levels representing the measurement-levels, pressure-comparator switches connected on one side to said transducers and on the other side thereof to a cyclic sweep-pressure generator common to said comparator-switches, motor-operated measurement-timed potentiometers connected to said comparator-switches, time-integrator potentiometers connected with said measurement-timed potentiometers and motor-driven throughout the cycle-time of the aforesaid sweep-pressure generator, a self-balancing potentiometer, a point-scanning step-switch intermediate said measurement-timed potentiometers and time-integrator potentiometers, on the one hand, and said self-balancing potentiometer, on the other hand, and arranged sequentially to connect the former to the latter.

11. A data-logging system according to claim 9, including range-adjusting potentiometers in series with said measurement-timed potentiometers.

12. A data-logging system according to claim 10, including range-adjusting potentiometers in series with said measurement-timed potentiometers.

13. A data-logging system according to claim 9, including an analog-to-digital converter connected to the output shaft of said self-balancing potentiometer, and a digital recorder connected to said converter.

14. A data-logging system according to claim 10, including an analog-to-digital converter connected to the output shaft of said self-balancing potentiometer, and a digital recorder connected to said converter.

15. A data-logging system according to claim 13, wherein the analog-to-digital converter has coded output circuits, and wherein a decoder is interposed between said converter and said digital recorder.

16. A data-logging system according to claim 10, including a program-timer arranged periodically to initiate the operation of said step-switch and said cyclic sweep-pressure generator.

17. A data-logging system according to claim 16, including an analog-to-digital converter connected to the output shaft of said self-balancing potentiometer, a data recorder connected to said converter, a feed-back circuit from said recorder to said step-switch to advance the latter after the read-out of the measurement-level of each point-of-measurement, and a program timer connected to said step-switch and to said cyclic sweep-pressure generator for periodically initiating the operation of each.

18. A method according to claim 8 wherein the analog position of said self-balancing indicator is converted into a coded digital value, and dividing the coded digital value and impressing the so-divided and de-coded digital value upon a typewriter or other recorder to cause the latter to record the digital value of the measurement-level.

References Cited in the file of this patent

UNITED STATES PATENTS

| | | |
|---|---|---|
| 1,597,828 | Roucka | Aug. 31, 1926 |
| 1,641,198 | Roucka | Sept. 6, 1927 |
| 1,898,182 | Harrison | Feb. 21, 1933 |
| 2,040,918 | Bristol | May 19, 1936 |
| 2,138,266 | Adelson | Nov. 29, 1938 |
| 2,441,632 | Holst | May 18, 1948 |
| 2,459,039 | Mesa | Jan. 11, 1949 |
| 2,465,191 | Borden | Mar. 22, 1949 |
| 2,682,652 | Grace | June 29, 1954 |
| 2,780,800 | Lauler | Feb. 5, 1957 |
| 2,799,821 | Hannig | July 16, 1957 |